United States Patent
Thompson et al.

(10) Patent No.: US 6,657,125 B1
(45) Date of Patent: Dec. 2, 2003

(54) ELECTRICAL HOUSING ASSEMBLY INCLUDING SERRATIONS AND ARCHED CLAMP FOR RETAINING NON-METALLIC SHEATHED CABLES

(75) Inventors: Charles B. Thompson, Memphis, TN (US); Ioan L. Lupsa, Dollard-des-Ormeaux (CA); Tomasz Bedkowski, Montreal (CA)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/159,895

(22) Filed: May 31, 2002

(51) Int. Cl.[7] .................................................. H02G 3/14
(52) U.S. Cl. .................... 174/65 R; 174/53; 174/58; 220/3.2; 220/3.3; 220/3.4; 220/3.92; 220/3.94
(58) Field of Search ................... 174/65 R, 53, 174/58; 220/3.2, 3.3, 3.4, 3.92, 3.94

(56) References Cited

U.S. PATENT DOCUMENTS

| | | | |
|---|---|---|---|
| 2,556,977 A | 6/1951 | Paige ........................ 285/24.5 |
| RE23,720 E | 10/1953 | Gillespie .................... 285/6.5 |
| 3,410,582 A | * 11/1968 | Appleton .................. 174/65 R |
| 3,676,571 A | * 7/1972 | Rubinstein ................ 174/65 R |
| 4,277,641 A | 7/1981 | Bauer et al. .............. 174/65 R |
| 4,304,958 A | 12/1981 | Neff et al. ................ 174/65 R |
| 4,306,109 A | 12/1981 | Nattel ......................... 174/51 |
| 4,316,999 A | 2/1982 | Nattel ...................... 174/65 R |
| 4,317,954 A | * 3/1982 | Giammarra .................. 174/53 |
| 4,526,435 A | * 7/1985 | Borne et al. ................ 439/470 |
| 4,591,658 A | 5/1986 | Bauer et al. .............. 174/65 R |
| 4,605,816 A | 8/1986 | Jorgensen et al. ......... 174/65 R |
| 4,972,044 A | 11/1990 | Kropa ...................... 174/65 R |
| 5,013,872 A | 5/1991 | Lockwood et al. ........ 174/65 R |
| 5,579,938 A | 12/1996 | Bourassa et al. ............ 220/3.2 |
| 5,932,844 A | 8/1999 | MacAller et al. ......... 174/65 R |
| 6,064,009 A | 5/2000 | Jorgensen et al. ........... 174/135 |
| 6,232,553 B1 | * 5/2001 | Regen ......................... 174/64 |

* cited by examiner

Primary Examiner—Dean A. Reichard
Assistant Examiner—Anton Harris
(74) Attorney, Agent, or Firm—Hoffmann & Baron, LLP

(57) ABSTRACT

An electrical box for supporting sheathed electrical cables therein holds and supports electrical cables in a preferred arrangement. A cable clamp structure is used for clamping electrical cables to a surface of an electrical box. The cable clamp structure has an arched configuration and serrations on a cable contacting surface in order to more efficiently store electrical cables in an electrical box.

11 Claims, 5 Drawing Sheets

ND ARCHED
ELECTRICAL HOUSING ASSEMBLY INCLUDING SERRATIONS AND ARCHED CLAMP FOR RETAINING NON-METALLIC SHEATHED CABLES

FIELD OF THE INVENTION

The present invention relates to an electrical box assembly for housing non-metallic sheathed cables as well as a clamping device for holding the cables in place within an electrical box. The electrical housing assembly provides a more efficient structure for retention of cables without damaging the outer non-metallic sheath of the cables stored in the electrical box.

BACKGROUND OF THE INVENTION

Electrical cables with non-metallic sheaths are generally housed in electrical boxes and squeezed between a surface of a clamp and an opposing surface of the electrical box. The clamp is generally tightened by a screw. Both the clamp and/or the box may contain an active surface coming in contact with the sheath of the cable.

The active surface of the box and/or the clamp may include embossments or like projections. Embossments are generally relief portions of the surface which are raised in the direction of the cable. Typically the height of the embossment exceeds or is very close to the thickness of the outer sheath of the cable. Examples of an electrical box with such embossments can be seen on the back wall of the electrical box in U.S. Patent No. 4,316,999 and on a curved surface of a spring finger in U.S. Patent No. 2,556,977.

When a clamp is tightened to a surface containing these embossments however, the outer sheath of the cable may be damaged due to the pressure of the clamping force on the electrical wires. The relief portions of the embossments may pierce the surface of the non-metallic sheath, thereby damaging the electrical cables.

The clamp is typically a planar clamp tightened against a wall of the box to secure electrical cables therein. The clamp is typically tightened with a torque in the range of approximately 10–35 inch-pounds, but may be more or less depending upon the circumstances. This pressure, in combination with the embossments and the flat shape of the clamp provide a hostile environment for the sheathed cables and often lead to damaged cables and results in improper electrical connections.

To provide a better clamping system in electrical boxes, it has been attempted to use a clamp with a curved surface in order to clamp electrical cables to an opposed surface. U.S. Patent No. 3,084,958 to Appleton and U.S. Patent No. 3,676,571 to Rubenstein both employ curved clamp structures in order to store electrical cables. In Appleton, a clamp assembly including an arched structure includes a jaw having a pair of integral arcuate shoes for engaging the cable or conduit and a stiffening wing disposed at an obtuse angle to the plane of the shoes. Each of these jaws is located at the end of the clamping structure. The Rubenstein reference similarly contains an arch structure which is used to restrain a cable against an opposed wall of an electrical box. The curved portions of the brackets however, merely serve to center the cable in the bracket when pressure is applied to the opposed surface of the electrical box. Each of these electrical cable boxes with curved surfaced brackets, however, fails to provide adequate gripping members for the cable.

U.S. Patent No. 2,556,977 to Paige discloses spring fingers with a curved surface used to store electrical cables in a box. The outer convex surface of the fingers further contains serrations which are used as gripping members for the electrical cable. While the serrations on the convex surface of the fingers in Paige are somewhat of an improvement over the prior art, they still do not provide an adequate fit for electrical cables in the box construction, as the convex surface of the fingers do not naturally "hug" cables as a concave surface does. Furthermore, the spring member in Paige resiliently presses against the electrical cables to provide the compressive force to store the cables. It is desirable to provide a clamping system with a separate fastener to more easily control the compressive force storing the cables.

As mentioned above, the embossments of the prior art suffer from several deficiencies. The deficiencies are especially apparent when the embossments are used in conjunction with a compressive force which is necessary to store electrical cables, particularly cables with an outer non-metallic sheath. The compressive force in combination with the height of the embossments leads to damage to the cables.

It is desirous therefore to provide an electrical housing assembly for storing cables therein with a clamp system which is capable of storing electrical cables with a compressive force without damaging the cables.

It is desirous therefore to provide an electrical box for properly housing sheathed electrical cables. The electrical box desirably provides a snug fit for the electrical cables, including providing for the ability to clamp the electric cables with the proper force while not penetrating or damaging the sheath of the electric cable.

It is also desirous to provide an electrical box with improved serrations for gripping sheathed electrical cables stored therein. It is especially desirous to provide a gripping element less likely to pierce the cable sheathes.

The present invention also seeks to provide a more efficient clamp configuration to provide for proper storage of electrical cables. It is especially desirous to provide a clamp configuration which allows the proper torque force to clamp the electrical cables and not damage the cables.

SUMMARY OF THE INVENTION

An electrical housing assembly for supporting non-metallic sheathed electrical cables therein is provided. The housing assembly has an electrical box having a bottom wall with side walls projecting therefrom. The bottom and side walls define an open faced interior for receipt of one or more sheathed electrical cables therein. A clamp is additionally provided within the electrical box. The clamp structure is used for clamping non-metallic sheathed cable to an opposed surface of the box. The cable clamp has an arched surface including serrations thereon. The serrations are intended to engage the sheathed cable. The cable clamp structure provides a snug-fit for sheathed cables between the arched clamp and the bottom wall with the use of a fastener which secures the clamp to an opposed surface of the box to thereby securely hold one or more cables between the clamp and the opposed surface.

In another embodiment of the present invention an electrical housing assembly for supporting sheathed electrical cables is provided. The housing assembly is made up of an electrical box comprising a bottom wall with serrations for engaging the sheathed electrical cables. The bottom wall also has side walls projecting therefrom. A cable clamp is also provided for clamping non-metallic sheathed electrical cable. The cable clamp is an arched clamp with an opening therethrough. A fastener, preferably a screw, extends through the clamp opening and fastens the clamp to the bottom wall.

In a further embodiment of the present invention, an electrical housing assembly for supporting non-metallic sheathed electrical cables therein is provided. The housing assembly has an electrical box comprising a bottom wall with side walls projecting therefrom defining an open faced interior for receipt of one or more sheathed electrical cables. A clamp is used in conjunction with the electrical box for clamping at least one non-metallic sheathed cable to an opposed surface of the box. The clamp has an arched surface including serrations thereon for engagement with the sheathed cable or cables. A fastener is further provided for securing the clamp to an opposed surface of the box. The opposed surface of the box used in conjunction with the clamp includes serrations in order to securely hold the sheathed cable between the clamp and the opposed surface of the box.

In a still further embodiment of the present invention a cable clamp for securing at least one sheathed non-metallic electrical cable is provided. The cable clamp is preferably used in combination with an electrical box and a fastener to secure the cable to the electrical box. The cable clamp has an arched surface with serrations on a concave side of the arched surface.

DETAILED DESCRIPTION OF THE INVENTION

Figure 1:
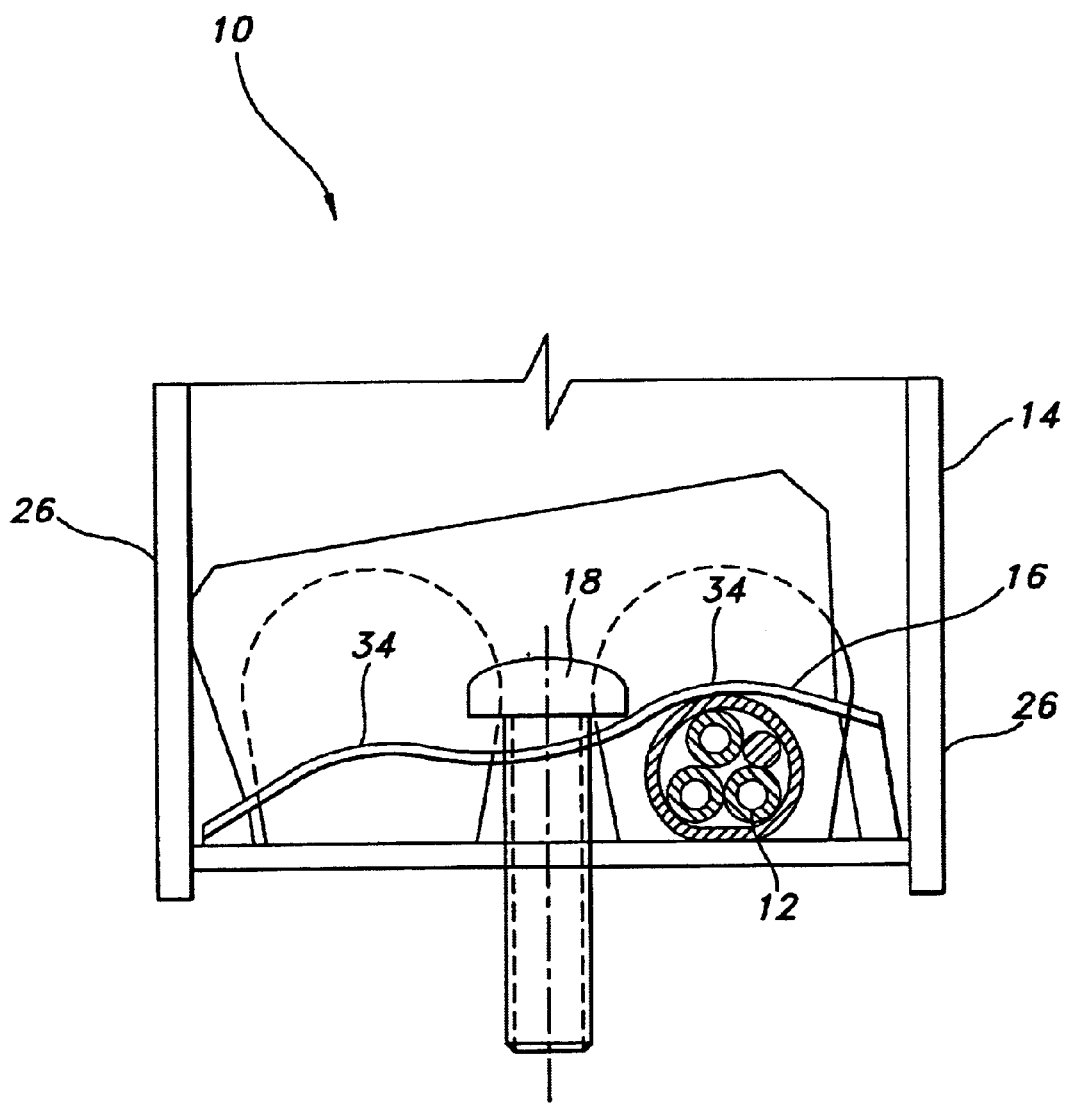
FIG. 1 is a cross-section of the electrical box and clamp of the present invention, illustrating the support of a non-sheathed electrical cable therein.

Referring to FIG. 1, an electrical housing assembly 10 for supporting one or more electrical cables 12 therein is herein provided. The electrical housing assembly 10 of the present invention is advantageously used for supporting sheathed electrical cables 12, and for providing the proper support for the cables without damaging cables 12. The electrical housing assembly includes an electrical box 14 and a cable clamp 16 used to clamp the electrical cable or cables 12 therein. A screw 18 attaches the arched clamp to the box and provides a snug fit for the electrical cable or cables 12.

Figure 2:
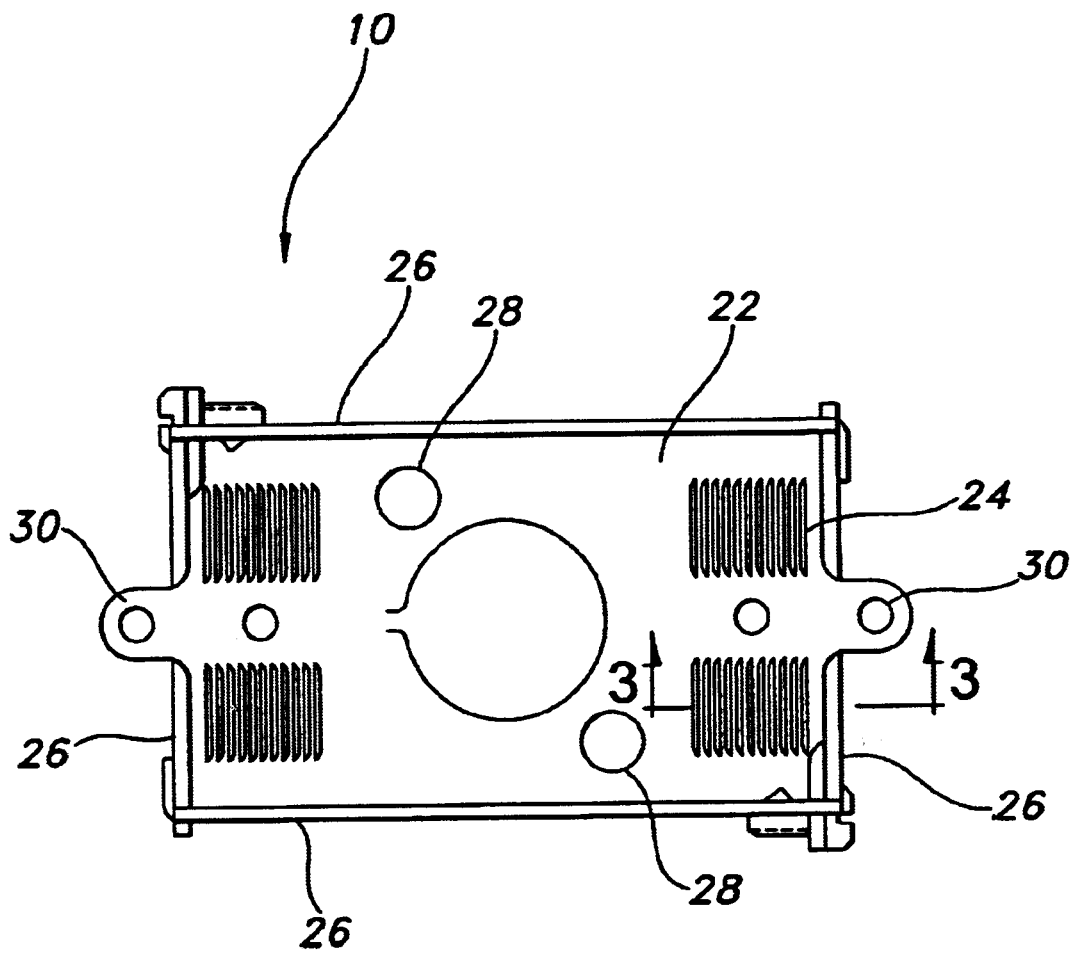
FIG. 2 is a top plan view of the electrical box of the present invention.

With further reference now to FIG. 2, the details of electrical box 14 are described. Box 14 comprises a bottom wall 22, and four sidewalls 26 projecting upwardly therefrom and defining thereby an open-faced structure. Electrical box 14 has knockout sections 28 as shown in FIG. 2. Sheathed electrical cables 12 (as shown in FIG. 1) are typically introduced into electrical box 14 through knockout sections 28, and it is contemplated that they can be positioned at any location within box 14. In a particular embodiment, knockout sections 28 are located adjacent serrations 24, as will be described, so that electrical cables introduced therethrough will advantageously lie across serrations for improved gripping of the cables. Electrical cables 12 may also be inserted through and come out either side of an open-faced electrical box. Brackets 30 are also shown in electrical box 14 and are used to fasten box 14 to a wall stud or other structural member. While a rectangular electrical box 14 is shown, it will be appreciated and is well known in the art that several different shaped boxes are contemplated; including, but not limited to, orthogonal, hexagonal, and circular.

In accordance with a preferred arrangement, bottom wall 22 has serrations 24 thereon, as shown in FIG. 2. Serrations 24 are shown on the surface of bottom wall 22 at an area intended to contact electrical cables. Serrations 24, which contain an active component to contact the cables, may be placed in a single area on bottom wall 22 or may be located in multiple areas as shown by the four locations on bottom wall 22 in FIG. 2.

Figure 3:
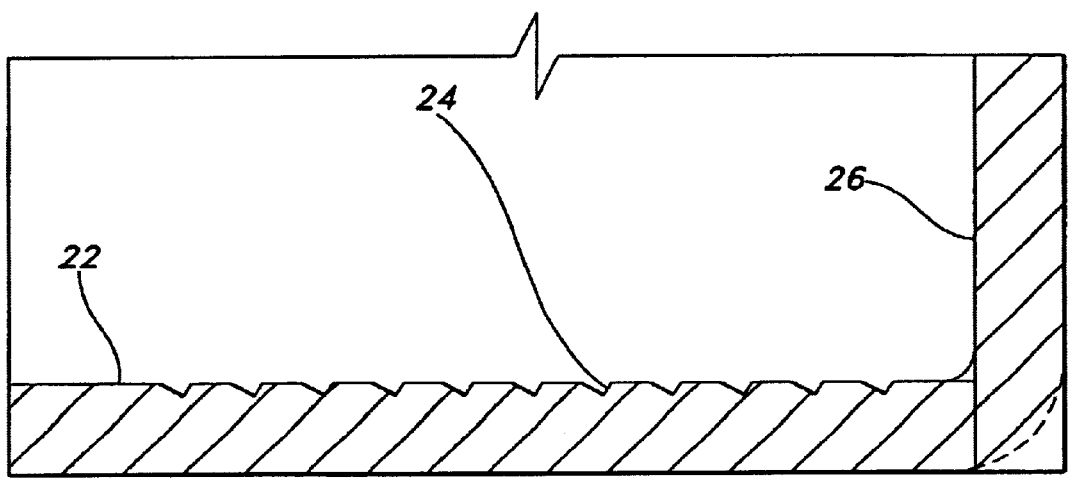
FIG. 3 is an enlarged, partial cross-section of the electrical box of FIG. 2 as shown along viewing lines III—III thereof, showing details of serrations on a bottom surface of such box.

Details of the serrations 24 are described now. Serrations 24 are elongate parallely spaced raised portions extending generally transversely from bottom wall 22. Serrations 24 extend transversely from bottom wall 22, and are spaced apart at a distance such that the height of the serrations is less than that of the typical prior art. In some instances, as shown in FIG. 3, the serrations are actually grooves extending within the surface in a direction opposite that of the sheathed cable with which the serrations come in contact. The end result in either case is that the serrations of the present invention do not penetrate the outer sheath of the electrical cables when a torque force is applied to clamp 16.

Electrical boxes are well known in the art and can be seen in U.S. Patent Nos. 4,316,999 and 4,304,958, herein incorporated by reference.

Figure 4:
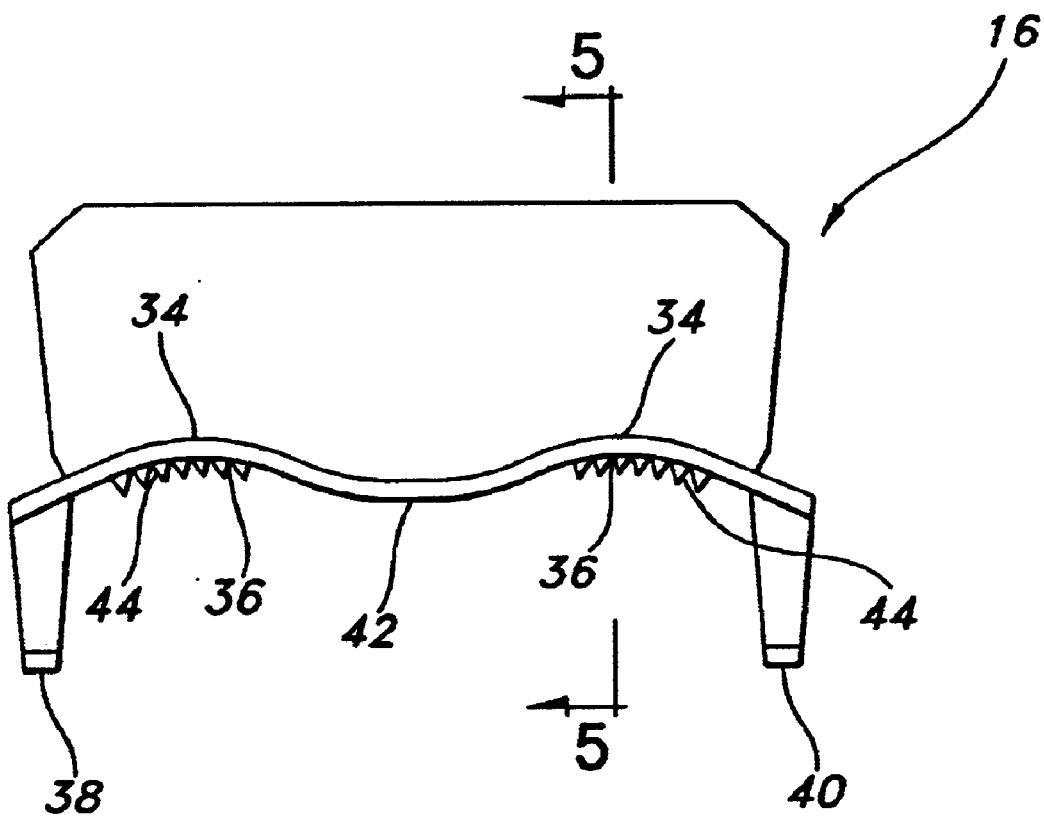
FIG. 4 is a side elevation view of the arched clamp of the present invention.

With reference now to FIG. 4, the details of the arched clamp 16 are shown. Arched clamp 16 is an elongate member with two arched sections 34 longitudinally spaced along clamp 16. Arched clamp 16 first and second depending ends 38, and 40, respectively, spaced apart at either side of the elongate member. Arched clamp 16 additionally includes an indented area 42 including a through-hole between the arched sections 34 in which a fastener, such as screw 18 is inserted therethough to secure arched clamp 16 to bottom wall 22 of the electrical box 14. The through-hole may be threaded. The first and second ends 38, 40 extend transversely from a plane extending from indented area 42 of clamp 16. The two arched sections 34 have concave surfaces 36, which define the cable contacting surfaces. Concave surfaces 36 preferably contain serrations 44, as will be described.

Figure 5:
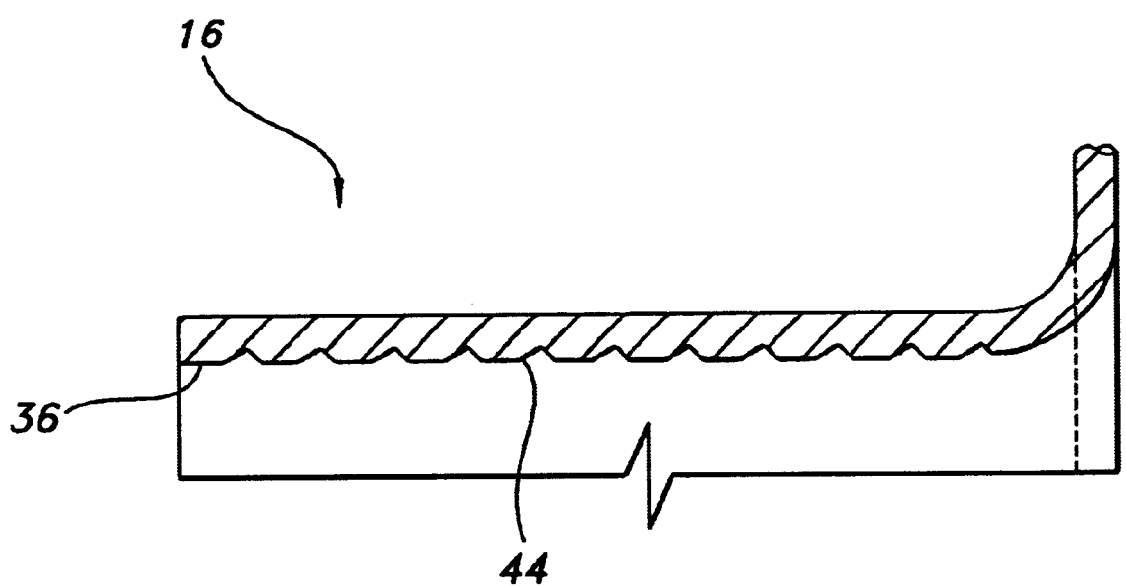
FIG. 5 is an enlarged, partial cross-section of the clamp of FIG. 4 as shown along viewing lines V—V thereof, showing details of serrations on the curved bottom surfaces of the clamp.

With reference now to FIG. 5, serrations 44 extend from surface 36 of clamp 16. The combination of arches and serrations on the box and/or the clamp provide a configuration which will transfer onto the cable only the force necessary for the cable retention without damaging the cable outer sheath. Serrations 44 on surface 36 are similar to serrations 24 on bottom wall 22 of box 14, and have been described in further detail with reference to FIGS. 2 and 3.

The arched configuration of the clamp provides several advantages over a planar or flat clamp with no arches, and many of these advantages can be seen in serrations 44. The arched surface area increases the contact surface area between the clamp and the round cable or cables. Because there is increased surface area coming in contact with the cables, it allows additional serrations to be provided on the clamp. The serrations are further provided over a larger surface area and this in turn allows a broad distribution of pressure when the clamp is tightened.

The arched configuration of the clamp provides other measures to insure the structural integrity of the cables stored therein. For example, and with reference to FIG. 4 of the drawings, the ends 38, 40 of the arches will touch the bottom wall 22 before the torque force applied crushes or damages cable 12. This is because the end of the clamp will touch the bottom and therefore prevent more force being applied to the cables. Because concave surfaces 36 of claim 16 are arched, they are conformal to the circumference of cable 12. Having described the particular embodiments of the invention herein, it should be appreciated that modifications may be made thereto without departing from the contemplated scope of the invention. Accordingly, the embodiments described herein are intended to be illustrative rather than limiting, the true scope of the invention being set forth in the claims appended hereto.

What is claimed is:

1. An electrical housing assembly for supporting a longitudinally extending non-metallic sheathed electrical cables therein comprising:
    an electrical box comprising a bottom wall and side walls projecting therefrom and defining an open faced interior for receipt of one or more sheathed electrical cables therein; and
    a clamp for clamping at least one non-metallic sheathed cable to an opposed surface of said box, said clamp comprising an arched surface including a plurality of transversely extending longitudinally spaced grooves thereon for engagement with said sheathed cable; and
    a fastener for securing said clamp to an opposed surface of said box to thereby securely hold said sheathed cable between said clamp and said box.

2. An electrical housing assembly according to claim 1, wherein said bottom wall of said electrical box further comprises a plurality of transversely extending longitudinally spaced grooves for engaging said sheathed cable.

3. An electrical housing assembly according to claim 1, wherein said grooves on said clamp are on a concave surface of said arched clamp which engages said sheathed cable.

4. An electrical housing assembly according to claim 1, wherein said open-faced structure comprises four side walls forming a rectangle-shaped box.

5. An electrical housing assembly for supporting sheathed electrical cables therein, said housing assembly comprising:
    an electrical box comprising a bottom wall with a plurality of grooves for engaging said sheathed cables, said box including side walls projecting from said bottom wall; and
    a cable clamp for clamping non-metallic sheathed cable, said cable clamp comprising an arched clamp with an opening therethrough; and
    a fastener extending through said clamp opening and fastening said clamp to said bottom wall.

6. An electrical box according to claim 5, wherein said arched clamp further comprises a plurality of grooves for engaging said sheathed electrical cable.

7. An electrical housing assembly for supporting non-metallic sheathed electrical cables therein, said assembly comprising:
    an electrical box comprising a bottom wall with spaced apart grooves thereon and side walls projecting therefrom and defining an open faced interior for receipt of one or more sheathed electrical cables therein;
    a clamp for clamping at least one non-metallic sheathed cable to said box, said clamp comprising an arched surface including spaced apart grooves thereon for engagement with said sheathed cable, said cable being disposed between said serrations on said box bottom wall and said serrations on said clamp; and
    a fastener for securing said clamp to said box to thereby hold said cable between said clamp and said bottom wall of said box.

8. A cable clamp for securing at least one sheathed non-metallic electrical cable to an electrical box, said cable clamp comprising an arched surface with a plurality of spaced grooves on a concave side of said arched surface.

9. A cable clamp of claim 8 wherein said cable clamp has a through-hole.

10. The cable clamp of claim 9 further including a fastener securing said cable clamp to said electrical box, said fastener extending through said through-hole.

11. The cable clamp of claim 10 wherein said electrical box further comprises a plurality of spaced grooves.

* * * * *